Jan. 26, 1960　　　J. A. RUBICO　　　2,922,236
PLASTIC WELT FOR SHOES
Filed Oct. 24, 1956
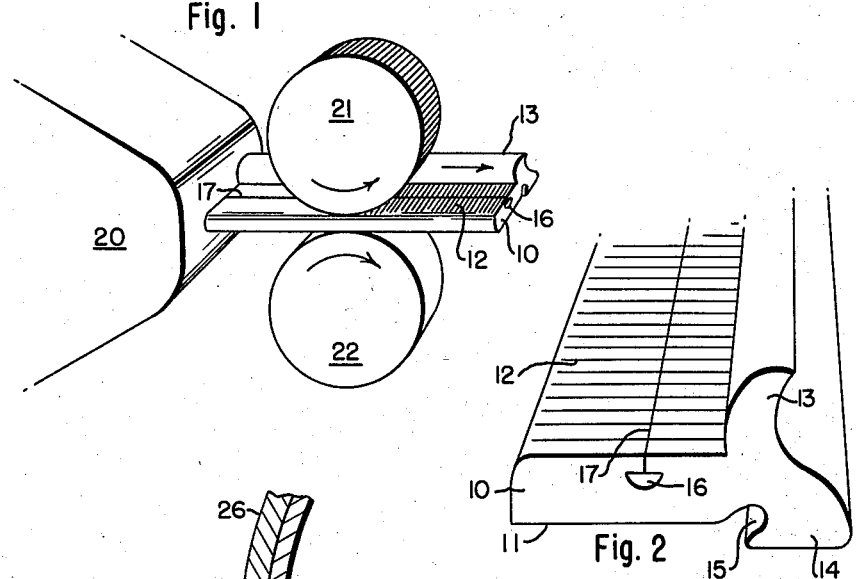
Fig. 1
Fig. 2
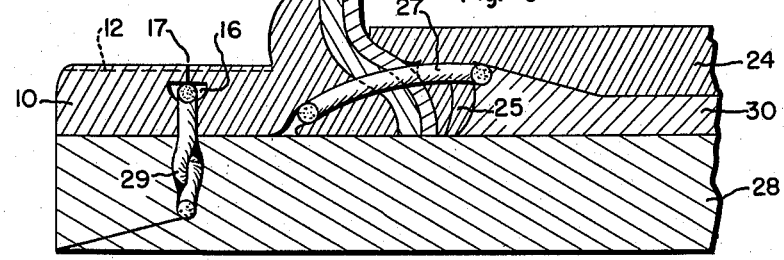
Fig. 3
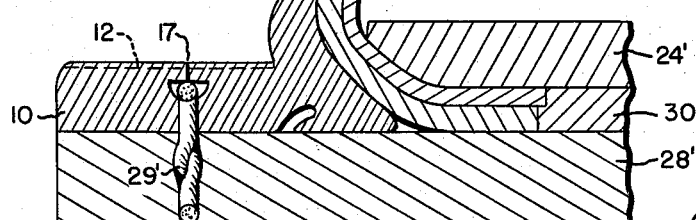
Fig. 4
Fig. 5
INVENTOR.
Jerome A. Rubico
BY Kenway, Jenney, Witter & Hildreth
Att'ys.

United States Patent Office 2,922,236
Patented Jan. 26, 1960

2,922,236

PLASTIC WELT FOR SHOES

Jerome A. Rubico, Boston, Mass., assignor to Shoe Patents Corporation, Passaic, N.J., a corporation of Delaware Application October 24, 1956, Serial No. 617,962

2 Claims. (Cl. 36—78)

This invention comprises a new and improved shoe welt of synthetic plastic material having novel provision for concealing an outseam when used in shoes of the Goodyear welt type, and in all fields of use presenting an attractive and ornamental finish.

Plastic welting has been produced heretofore by extruding under pressure plasticized vinyl resins or the like as a continuous strip of tough, flexible, waterproof material well adapted to retain both the inseam stitching and the outsole stitching and to improve the wear and appearance of the shoes in which it is incorporated. Such plastic material is available in the market under the name of "Koroseal" and "Vinylite."

I have discovered that welting of novel shape and characteristics may be produced by modifying or supplementing the extrusion operation so as to form in the body of the welt a continuous longitudinal seam-concealing passage. The passage may be formed in the welting as it is extruded or after it emerges from the extruding die and in any desired location in the welting. In a shoe welt having an attaching flange, the passage is tubular and formed in position to receive the outseam and below the exposed face of the flange.

Another feature of the invention comprises the provision of resilient flaps in the exposed face of the welting which permit the stitches of the seam to be drawn into the concealed passage and then automatically close above the seam when it has been established in its final position. These flaps are herein shown as formed in part by a normally closed slit extending downwardly from an exposed face of the welting into the passage.

Still another feature of the invention consists in providing portions of plastic welting with a wheeled or closely corrugated surface of ornamental character. This conformation conceals the slit and presents an ornamental effect desirable in many types of shoes. The conformation may be imparted to the welting by subjecting it to the action of a corrugated roll or wheel as it emerges from the extruding dies and before attaining its final somewhat stiff and resilient characteristics.

These and other features of the invention will be best understood and appreciated from the following description of a preferred embodiment thereof selected for purposes of illustration and shown in the accompanying drawings in which:

Fig. 1 is a diagrammatic view in perspective illustrating the extruding and wheeling steps, Fig. 2 is a fragmentary view in perspective and on an enlarged scale of a portion of the resulting welting, Fig. 3 is a view in cross-section on an enlarged scale showing the welting as incorporated in the bottom of a Goodyear welt shoe;

Fig. 4 is a similar view showing the welting incorporated in a cement lasted shoe, and Fig. 5 is a fragmentary view of the welting in a modified form.

The illustrated welting herein shown comprises an attaching flange 10, substantially rectangular in cross-section, having a plain lower or sole-engaging face 11 and an oppositely directed exposed face 12 ornamented by wheeled transverse corrugations. The welting includes also a lower inseam-receiving portion 14 which is defined in part by a downwardly opening seam-receiving channel 15 and may be made with or without the upstanding bead 13 shown in Fig. 3.

Within the body of the attaching flange 10 is formed a continuous longitudinal tubular passage 16 herein shown as semi-circular in cross-section and located between the faces 11 and 12 of the flange with its concave face downwardly directed. A normally closed slit 17 extends downwardly from the face 12 into the upper flat wall of the passage 16 and defines in part a pair of resilient oppositely directed flaps which may be temporarily separated when the stitches of an outseam are forcibly drawn between them and into the passage 16. After such distortion the flaps immediately and automatically reassume their initial position completely closing the slit 17 and concealing all traces of the seam in the passage 16.

The shoe welt of the character shown in Fig. 2 may be extruded in plastic condition from an extruding die 20 having an outlet nozzle of the proper shape to form the flanges and the bead of the welting. The passage 16 and the slit 17 are preferably formed by the configuration of the extruding die itself although if preferred these two features may be formed as the material emerges from the die 20. The wheeled configuration is imparted to the surface 12 by passing the extruded welting through the bite of a pair of rolls 21 and 22, the roll 21 having a transversely corrugated surface for indenting the welting and the roll 22 having a plain supporting surface.

A welt thus formed is shown in Fig. 3 as incorporated in a conventional shoe of the Goodyear welt type having an insole 24 provided with the usual rib 25. The upper 26 is secured to the welt and to this rib by stitches 27 of the inseam formed in the welt sewing operation. The outsole 28 lies beneath the insole and is secured to the welt by the lockstitches 29 of the outseam. These, as already explained, are forcibly drawn down between the two flaps formed by the slit 17 into the passage 16. In Fig. 3 the flaps are shown as having resumed their initial position after having been temporarily displaced to admit the stitches 29. The usual filler 30 fills the cavity between the insole and the outsole. The exposed wheeled face of the welt presents an ornamental appearance which is mechanically accurate in respect to the spacing and depth of the transverse corrugations and these tend to render the slit 17 hardly noticeable in the finished shoe.

In Fig. 5 is shown a portion of the welting modified from that of Fig. 2 in that the attaching flange 10' is extruded in slightly concave shape so that the slit 17' is initially open to a very slight degree. As a result of this concave shape the attaching flange will be straightened when it is pulled down upon the outsole by the outseam and the edges of the slit will consequently be forced together and held closely by the resiliency of the material.

In Fig. 4 the welting is disclosed as incorporated in a shoe of the cement lasted type in which the upper 26' is secured to the bottom of the insole 24' by cement. The welt in this case may be attached to the outsole 28' by stitches 29' of a lockstitch seam or it may be fair-stitched to the outsole by a straight needle sewing machine or by any type of seam formed at any stage of the shoemaking process. In all cases, however, the seam will be pulled down into the concealed passage and completely hidden therein.

It is noted that the stitch-receiving passage 16 is of symmetrical cross-section and that it is evenly bisected by the normally closed slit 17. The slit thus defines a pair of opposed flaps that are similar in shape and size and so facilitate displacement of the flaps in receiving the seam.

The channel 15 may of course be omitted in welting for use in shoes of Littleway, Compo or Stitchdown types. The attaching flange, shown as concave in Fig. 5, may be given an equivalent angular shape for closing the slit 17', and the welt may be applied to a midsole in shoes where that is found.

Having thus disclosed my invention and described in detail an illustrative embodiment thereof, I claim as new and desire to secure by Letters Patent:

1. A welt having a body of resilient plastic material with an outwardly extending flange provided with an exposed face imprinted with transversely extending corrugation and having a longitudinal stitch-receiving passage disposed parallel to and beneath its said corrugated face and a normally closed longitudinal slit above said passage forming oppositely directed resilient flaps that may be temporarily displaced when a seam-forming thread is drawn into the passage and concealed therein below the corrugated face of the welt.

2. A welt of resilient material having an outwardly extending attaching flange substantially rectangular in cross-section and an inseam receiving portion provided with a downwardly opening channel for the inseam, a passageway formed longitudinally within the body of said flange, said passageway being semi-circular in cross-section, a slit along the upper portion of said flange extending vertically downward to bisect said passageway, said slit being effective to form normally closed self-returning flaps to conceal a seam along the root of said passageway.

References Cited in the file of this patent

UNITED STATES PATENTS

| | | |
|---|---|---|
| Re. 19,407 | Wood | Dec. 25, 1934 |
| 73,570 | Blake | Jan. 21, 1868 |
| 1,577,791 | Dreschler | Mar. 23, 1926 |
| 1,695,967 | Lyon | Dec. 18, 1928 |
| 1,695,969 | Lyon | Dec. 18, 1928 |
| 1,728,366 | Ruggiero | Sept. 17, 1929 |
| 1,735,457 | Gilson | Nov. 12, 1929 |
| 2,103,331 | Mathews | Dec. 28, 1937 |
| 2,399,086 | Wright | Apr. 23, 1946 |
| 2,448,165 | Wright | Aug. 31, 1948 |

FOREIGN PATENTS

| | | |
|---|---|---|
| 221,651 | Great Britain | Sept. 18, 1924 |
| 442,837 | Great Britain | Jan. 29, 1935 |
| 617,366 | Great Britain | Aug. 17, 1935 |
| 924,426 | Germany | Mar. 3, 1955 |